INVENTOR
JOSEPH M. TYRNER

INVENTOR
JOSEPH M. TYRNER
BY
ATTORNEYS

Patented June 24, 1947

2,422,811

UNITED STATES PATENT OFFICE 2,422,811

ARC WELDING APPARATUS

Joseph M. Tyrner, New York, N. Y., assignor to Air Reduction Company, Incorporated, a corporation of New York Application May 15, 1945, Serial No. 593,801

10 Claims. (Cl. 219—8)

This invention relates to arc welding apparatus of the type in which an electrode holder is moved along a guide to cause progression of the electrode along the seam or joint to be welded. More particularly, the invention relates to an improved adjustable support for the guide on which the electrode holder moves.

In various welding operations it is desirable to give the electrode a lateral inclination with respect to the direction in which the electrode progresses along the seam to be welded, i. e. so that the plane in which the electrode moves along the seam is inclined with respect to the vertical, and it is desirable to be able to adjust the amount of such lateral inclination of the electrode. For instance, when making fillet welds wherein the electrode tip is drawn along a work corner where the weld is to be made, it is desirable to give the electrode lateral inclination so that will move in a plane which makes an angle to the vertical wall of the work corner in order that the electrode will be pointed into the work corner. Any means for adjusting the lateral inclination of the electrode, after the apparatus has been properly positioned with the electrode tip in the work corner or in the desired position at the seam, is likely to shift the tip of the electrode laterally away from its proper position unless in making the adjustment the electrode is moved about its tip as a center.

The principal object of this invention is to provide improved supporting means for the guide on which the electrode holder moves which is capable of adjustment in a way that will vary the lateral inclination of the electrode by moving it about its tip as a center when the tip is in the work corner or at the level of the line of weld.

Welding apparatus embodying the invention is illustrated in the accompanying drawings, in which—

Figure 1:
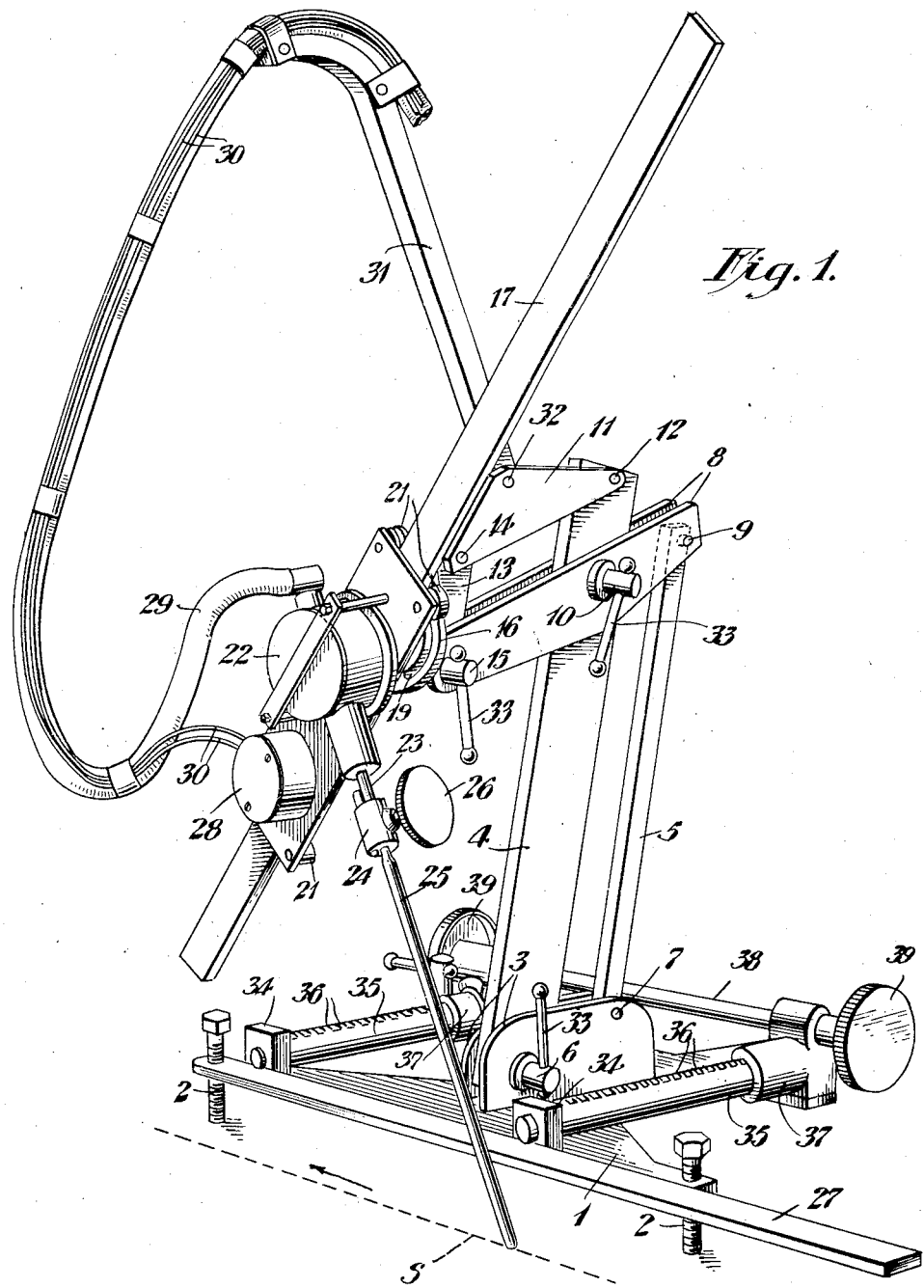
Fig. 1 shows the apparatus in perspective as it appears when viewed almost from the front.

Referring to the drawings, and particularly to Fig. 1, the support for the electrode-holder guide comprises a base 1 of any suitable type which may be adjusted vertically by means of the adjusting screws 2. The base carries a pair of flanges 3 between which a front upstanding link 4 and a rear upstanding link 5 are pivoted at their lower ends. The pivot about which the lower end of the front link 4 moves is the axis of a clamp-shaft 6. The pivot about which the lower end of the rear link 5 moves is shown at 7.

The links 4 and 5 are pivotally connected together near their upper ends by a cross-link 8. The pivot which connects the rear link 5 to the cross-link 8 is shown at 9 and the pivotal connection between the front link 4 and the cross-link 8 is a clamp-shaft 10. The front link 4 extends upwardly beyond the cross-link 8 and the cross-link 8 extends forwardly beyond the link 4. An auxiliary cross-link 11 is pivotally connected to the upper end of link 4 at 12 and extends parallel to the cross-link 8. The forward ends of the cross-links 8 and 11 are pivotally connected to a bracket-plate 13 by the pivot 14 and clamp-shaft 15, respectively. Thus, the base and bracket-plate 13 form with the links 4, 5, 8 and 11 a folding parallelogram structure made up of two folding parallelograms, one being formed by the base or its flanges 3, the links 4 and 5 and the right end of cross-link 8, and the other being formed by the bracket-plate 13, cross-link 11, upper end of link 4 and left end of cross-link 8. The axes of all of the pivotal connections are horizontal and parallel to the path of travel of the tip of the electrode as will later appear.

The bracket-plate 13 has a right angularly disposed plate 16 to which the electrode-holder guide is attached. Any suitable type of guide may be attached to the bracket and the means for movably supporting the electrode on the guide may be of any appropriate type. For instance, the guide and the parts mounted on it may be similar to those disclosed in my copending application, Serial No. 543,883, filed July 7, 1944. Such a guide is shown at 17. It is pivoted to the plate 16 of the bracket and may be clamped to it in any angular position to which it is adjusted by a bolt 18 extending through an arcuate slot 19 in the plate. An electrode carriage 20 is adapted to move longitudinally of the guide 17 and is guided thereon by means of rollers 21. The carriage supports a casing 22 which encloses a magnetic arc starter. The details of the arc starter have nothing to do with the present invention, it being sufficient for the present purpose to note that a rod 23 projects downwardly out of the casing 22 and this rod carries an electrode holder 24 in which the upper end of an electrode 25 is adapted to be clamped by turning a knob or hand-wheel 26.

Preferably, the guide 17 is adjusted so that it is inclined downwardly, as disclosed in the above-mentioned copending application. The welding apparatus then operates on the so-called gravity feed principle, i. e. as the electrode, which continually bears against the work at its tip end, is consumed, the carriage 20 moves down the guide 17 by gravity to impart to the electrode a movement of progression along the seam to be welded. In Fig. 1 the seam to be welded is represented by the dotted line S and movement of the carriage down the guide as the electrode is consumed will cause movement of the electrode tip along the seam in the direction of the arrow.

As the tip of the electrode is drawn along the seam the lower end of the electrode is guided by a bar 27 which extends parallel to the direction of movement of the electrode and is adjustably mounted on the base 1 as hereinafter described.

The casing shown at 28 on the carriage 20 houses a magnetic brake for holding the carriage stationary on its guide 17 during the starting of the arc. The arc is started when the welding current is turned on by the magnetic starter in the casing 22 which retracts the rod 23 into the casing and draws the tip of the electrode away from the work to strike the arc. Welding current is supplied to the electrode by means of a cable 29, the current first passing through the magnetic starter in the casing 22 and then to the electrode. The work to be welded is connected to the other side of the welding circuit. Current for operating the magnetic brake in the casing 28 is supplied by means of conductors 30. A conductor-supporting prop 31 may be provided which is preferably secured at its lower end to the auxiliary link 11, as shown at 32, and rises vertically from this link. Its upper end is curved, as indicated, to form a support for the welding cable 29 and the brake conductors 30, enough slack being allowed in them at the forward side of the prop to form a loop which permits free movement of the carriage on the guide 17.

Figure 2:
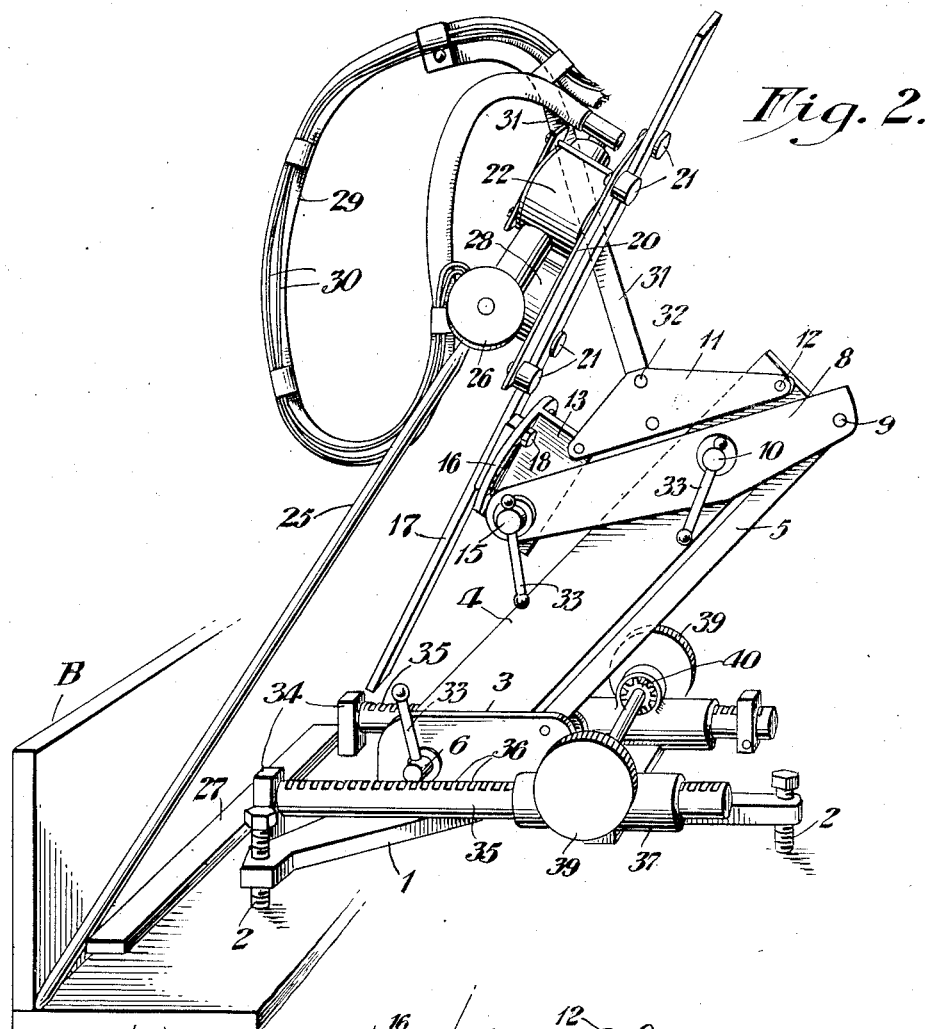
Fig. 2 shows the apparatus in perspective as it appears when viewed more from the side and after the support for the electrode-holder guide has been adjusted to change the lateral inclination of the electrode.
Figure 3:
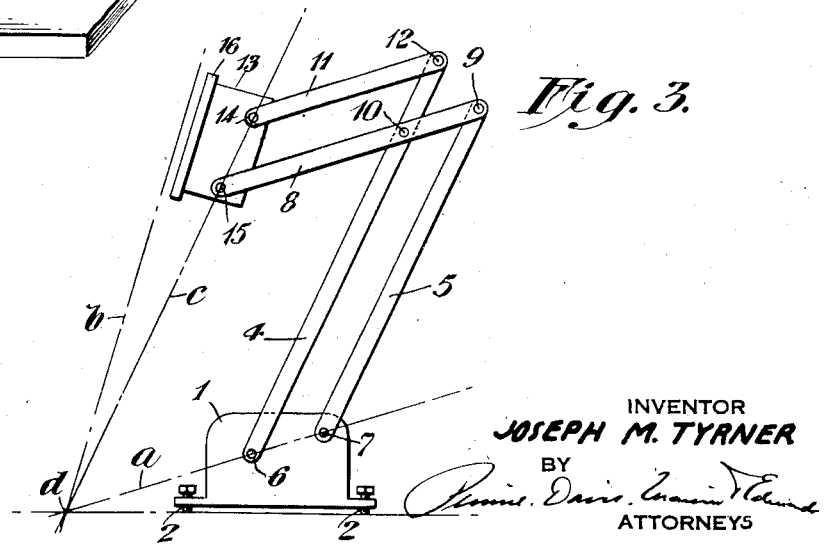
Fig. 3 is a diagram illustrating the principle of operation of the adjustable support for the electrode-holder guide.

Each of the clamp-shafts 6, 10 and 15 may be turned by a handle 33. When the clamps are tightened the links forming the two folding parallelograms are held against pivotal movement and form a rigid support for the guide 17. When the clamps are loosened the support may be adjusted by folding, or partially folding, the parallelograms, as indicated in Fig. 3, whereupon the clamps may be again tightened to hold the parts in adjusted position. It will be seen that adjusting the support in this fashion changes the inclination of the plane of the bracket-plate 16 and consequently the plane of the guide 17 and the plane in which the electrode moves. Fig. 2 shows the support adjusted to bring the electrode to a lateral inclination suitable for making a fillet weld along a work corner formed by a horizontal plate A and a vertical plate B.

By referring to the diagram of Fig. 3 it will be seen that the links are so arranged and so pivoted to the base 1 and to the bracket-plate 13 that a plane passing through the pivots 6 and 7 by which the links 4 and 5 are pivoted to the base is inclined forwardly and downwardly, as indicated by the line $a$. The line $b$ represents the generatrix of the plane in which the electrode moves in a direction normal to the sheet on which Fig. 3 is drawn. The apparatus is so designed that this plane intersects a plane or line $c$ passing through the pivots 14 and 15 by which the cross-links 8 and 11 are pivoted to the bracket 13–16. The plane generated by the line $b$ and the plane represented by the line $c$ both intersect the plane represented by the line $a$ at a line or axis represented at $d$. It will be apparent that adjustment of the support in either direction about the pivots 6 and 7 will shift the plane $b$ about the axis $d$. Therefore, after the apparatus has been positioned with the tip of the electrode at the seam at the axis $d$, the electrode can be tilted laterally to any desired position by adjusting the support about the pivots 6 and 7 without moving the electrode tip laterally away from the axis $d$ because the electrode tilts about its tip as a center. If the axis $d$ is not at the level at which it is desired to make the weld it may be brought to such level by adjusting the screws 2 on the base 1. For instance, the axis $d$ may be made to lie at the level of the surface W on which the base 1 rests, as in Fig. 3, or at a lower level, as when making a weld along a seam in a depression below the level of the surface W, or at a higher level as when making a weld along a seam which is above the level of the surface W.

When the support is folded to tilt the electrode, it is necessary to move the guide bar 27 back. This may be accomplished in any suitable way. For instance, the guide bar may have a pair of upstanding lugs 34 each of which is connected to a rearwardly extending rack bar 35 provided with rack teeth 36 along its upper surface. Each rack bar slides in a bearing sleeve 37 secured to the base 1. A rotary shaft 38 journalled in portions of the two bearing sleeves 37 extends from one rack bar to the other and may be turned by either of two knobs 39 at opposite ends of the shaft. The shaft 38 carries two pinions each of which meshes with the teeth on one of the rack bars. Only one of these pinions appears in the drawings at 40 in Fig. 2. It will be apparent that by turning either of the knobs 39 the two rack bars 35 may be simultaneously moved in their bearing sleeves 37 to adjust the guide bar 27 either forwardly or rearwardly. After the guide bar 27 has been retracted to permit tilting of the electrode it is returned to proper position to guide the lower end of the electrode after the support has been adjusted to impart to the electrode the desired lateral inclination.

The adjustable support herein described is useful for supporting any kind of mechanism for producing movement of an electrode in a given plane where it is desired to give such plane an inclination to the vertical without shifting the tip of the electrode laterally away from the line of weld after it once has been brought to its proper position with respect to the line of weld, and the invention is not limited to the particular type of welding means herein shown and described as being supported by the bracket 13—16. This bracket may, for example, support the parts shown in my copending application, Serial No. 584,093, filed March 22, 1945, by which an electric motor feeds an electrode at a constant rate as it is consumed both toward the work and in the direction in which the electrode is to travel along the seam to be welded, where it is desired to adjust the lateral inclination of the electrode, as in fillet welding.

I claim:

1. Arc welding apparatus comprising means for guiding an electrode along the seam to be welded, and means for adjusting the lateral inclination of the electrode comprising an adjustable folding parallelogram support for the first-named means having a system of pivoted links and adapted when folded or unfolded to tilt the electrode laterally about its tip as a center when the tip is positioned at the seam to be welded.

2. Arc welding apparatus comprising means for guiding an electrode along the seam to be welded, a support for said means comprising a vertically adjustable base, a bracket for attachment to said first-named means, a system of pivoted links pivoted to the base and to said bracket and forming with the base and bracket a folding parallelogram structure adapted when folded or unfolded to tilt the electrode laterally about its tip as a center when the tip is positioned at the seam to be welded.

3. Arc welding apparatus comprising means for guiding an electrode along the seam to be welded, a member attached to said means, a base, said member and base comprising part of a folding parallelogram structure adapted when folded or unfolded to tilt the electrode laterally about its tip as a center when the tip is positioned at the seam to be welded, said folding parallelogram structure further comprising front and rear upstanding parallel links pivoted at their lower ends to said base, upper and lower parallel cross-links pivoted to said member, the upper cross-link being pivoted to the upper end of the front upstanding link and the lower cross-link being pivoted at a lower point to the front upstanding link and also pivoted to the upper end of the rear upstanding link.

4. Arc welding apparatus in accordance with claim 3 having means for locking the links against pivotal movement after the folding parallelogram structure has been adjusted to give the electrode the desired lateral inclination.

5. Arc welding apparatus comprising means for causing movement of an electrode along the seam to be welded, means for adjusting the lateral inclination of the electrode, a guide for guiding the lower portion of the electrode as the electrode moves along the seam to be welded, and means for adjusting said guide transversely of the path of travel of the electrode tip whereby when the lateral inclination of the electrode is adjusted said guide may be adjusted accordingly.

6. Arc welding apparatus comprising means for causing movement of an electrode along the seam to be welded, a base, means mounted on the base for adjusting the lateral inclination of the electrode, a guide for guiding the lower portion of the electrode as the electrode moves along the seam to be welded, and means carried by the base for adjusting said guide transversely of the path of travel of the electrode tip when the lateral inclination of the electrode is adjusted.

7. Arc welding apparatus comprising a guide, a carriage movable along said guide, an electrode holder on the carriage, an electrode mounted in the holder with the tip of the electrode in contact with the work whereby movement of the carriage along the guide moves the electrode tip along the seam to be welded, and means for adjusting the inclination of the plane in which the electrode is caused to be moved by the guide whereby the electrode can be given a lateral inclination, said means comprising a member attached to said guide, a base, front and rear upstanding links pivoted at their lower ends to the base, and upper and lower cross-links pivoted at their forward ends to said member, the upper cross-link being pivoted to the upper end of the front upstanding link and the lower cross link being pivoted at a lower point to the front upstanding link and also pivoted to the upper end of the rear upstanding link, the axes of all of the pivotal connections between said parts being horizontal and parallel to the path of travel of the electrode tip along the seam to be welded.

8. Arc welding apparatus comprising means for guiding an electrode along the seam to be welded, a support for said means comprising a vertically adjustable base, a member attached to said means, said member and base comprising part of a folding parallelogram structure adapted when folded or unfolded to tilt the electrode laterally about its tip as a center when the tip is positioned at the seam to be welded, said folding parallelogram structure further comprising front and rear upstanding parallel links pivoted at their lower ends to said base, upper and lower parallel cross-links pivoted to said member, the upper cross-link being pivoted to the upper end of the front upstanding link and the lower cross-link being pivoted at a lower point to the front upstanding link and also pivoted to the upper end of the rear upstanding link.

9. Arc welding apparatus in accordance with claim 7 in which the pivots at the lower ends of the upstanding links are disposed in a forwardly and downwardly inclined plane and in which the base is provided with means for adjusting it vertically.

10. Arc welding apparatus comprising a guide, a carriage movable along said guide, an electrode holder on the carriage, an electrode mounted in the holder with the tip of the electrode in contact with the work whereby movement of the carriage along the guide moves the electrode tip along the seam to be welded, and means for adjusting the inclination of the plane in which the electrode is caused to be moved by the guide whereby the electrode can be given a lateral inclination, said means comprising a member attached to said guide, a base, front and rear upstanding links pivoted at their lower ends to the base, upper and lower cross-links pivoted at their forward ends to said member, the upper cross-link being pivoted to the upper end of the front upstanding link and the lower cross-link being pivoted at a lower point to the front upstanding link and also pivoted to the upper end of the rear upstanding link, the axes of all of the pivotal connections between said parts being horizontal and parallel to the path of travel of the electrode tip along the seam to be welded and the pivots at the lower ends of the upstanding links being disposed in a forwardly and downwardly inclined plane, means for adjusting the base vertically, and a transversely adjustable guide on the base for guiding the lower portion of the electrode along the seam to be welded.

JOSEPH M. TYRNER.

REFERENCES CITED

The following references are of record in the file of this patent:

UNITED STATES PATENTS

| Number | Name | Date |
| --- | --- | --- |
| 2,182,575 | Baird et al. | Dec. 5, 1939 |